United States Patent Office 3,506,549
Patented Apr. 14, 1970

3,506,549
ELECTROLYTIC REDUCTION OF CYCLO-PENTANOPHENANTHRENE DERIVATIVES
Lewis J. Throop, Los Altos, Calif., and Alexander D. Cross, Mexico City, Mexico, assignors to Syntex Corporation, Panama, Panama, a corporation of Panama
No Drawing. Continuation-in-part of application Ser. No. 560,831, June 27, 1966. This application July 5, 1967, Ser. No. 651,151
Int. Cl. B01k 1/00
U.S. Cl. 204—75        11 Claims

ABSTRACT OF THE DISCLOSURE

Electrochemical reduction of an isolated steroidal ketone or isolated steroidal aldehyde at a cathode of high hydrogen over-voltage in an electrolytic medium comprising mineral acid electrolyte, water and water-miscible, inert organic solvent.

---

This application is a continuation-in-part of U.S. application Ser. No. 560,831, filed June 27, 1966, and now abandoned.

This invention relates to a novel process for the reduction of isolated steroidal ketones and isolated steroidal aldehydes by electrochemical means.

The expressions "isolated steroidal ketone" and "isolated steroidal aldehyde" as used herein and in the appended claims refers to a steroid, saturated or unsaturated, which contains at least one isolated carbonyl group or isolated aldehyde group, respectively. In the case of unsaturated steroids, said expressions include those steroidal ketones and aldehydes wherein the unsaturation is not in conjugated relationship with a carbonyl group or an aldehyde group.

Prior to the present invention, isolated steroidal ketones were reduced to the corresponding desoxy group by thioketalization followed by splitting off the thioketal group by treatment with Raney nickel or an alkali metal in the presence of liquid ammonia. Isolated steroidal aldehydes, heretofore, have been reduced to the corresponding desoxy compound by Wolff-Kishner or Huang-Minlon reduction. These and other prior art methods are disadvantageous in that several chemical steps are necessary to accomplish the conversion which are time consuming and difficult to operate.

A primary object of the present invention is to provide a process for the reduction of isolated steroidal ketones and aldehydes into the corresponding desoxy steroid by electrolysis which overcomes the aforementioned disadvantages. Another object of the present invention is to provide a process for the reduction of isolated steroidal ketones and aldehydes into the corresponding desoxy compound which is characterized by ease of operation and the production of relatively high yields of the desired final product. Additional objects of the present invention will become apparent as the invention is hereinafter described in detail and from the appended claims.

In accordance with the present invention, the reduction of an isolated steroidal ketone or aldehyde is accomplished by subjecting said isolated ketone or aldehyde to electrochemical reduction at a cathode of high hydrogen overvoltage in an electrolytic medium comprising mineral acid electrolyte, water and water-miscible, inert organic solvent.

Isolated steroidal ketones and isolated steroidal aldehydes to which the novel process of this invention is applicable includes those steroids, saturated and unsaturated, having an isolated oxo substituent or an isolated aldehyde substituent or both attached to a carbon atom of the steroid ring nucleus or a carbon atom of a side chain of the steroid. In the case of unsaturated steroids, it is necessary that the unsaturation is not in conjugated relationship with an oxo or aldehyde substituent in order to avoid dimerization or the formation of pinacols. The steroid can have substituents present other than oxo or aldehyde substituent such as hydroxy, acyloxy, alkyl, alkenyl, amino alkinyl, fluoro, bromo, chloro, bismethylenedioxy, and the like which are stable to the acid conditions of the reaction. However, a substituent which is alpha to an isolated carbonyl group such as hydroxy, acyloxy, alkoxy, halo, oxido or thio will be cleaved in the practice of the process of the present invention. To illustrate the process of the present invention, the following diagrammatic illustrations are provided. For the sake of simplicity only, a partial formula of the steroid is shown.

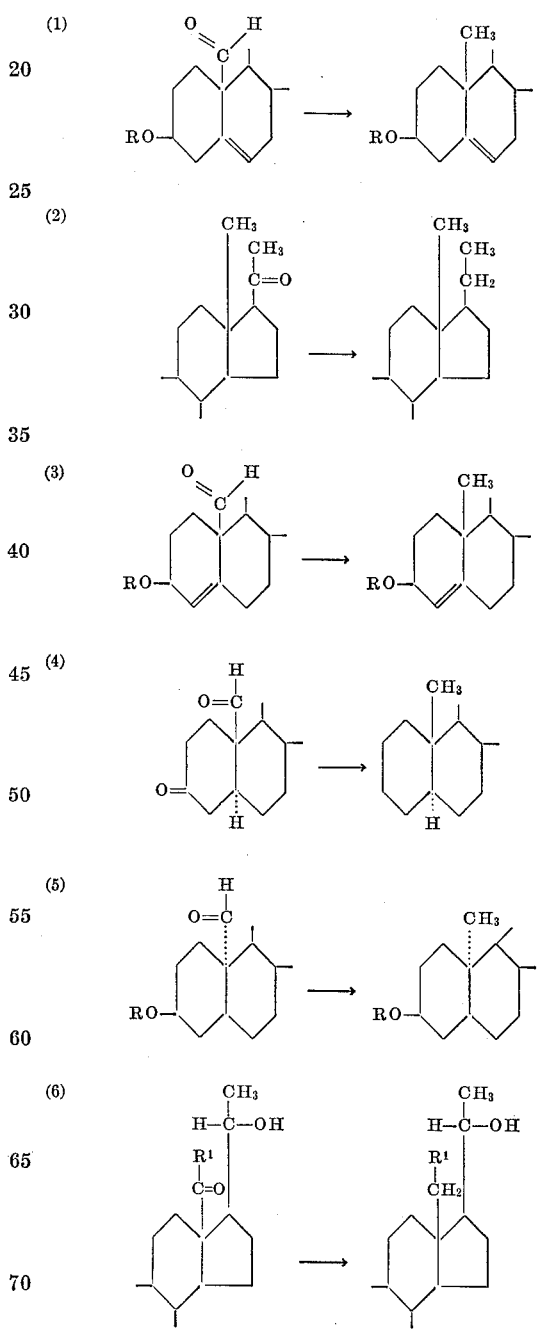

(7)

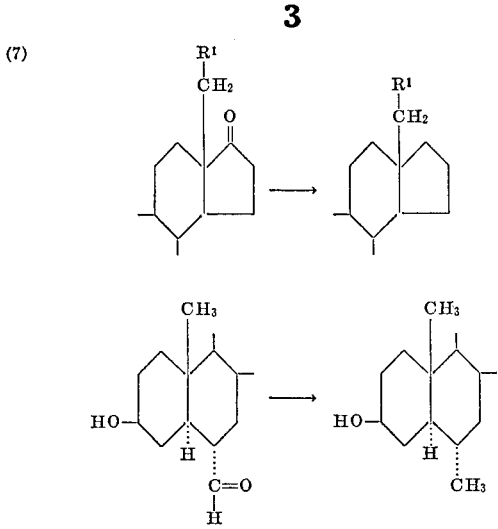

In the above partial formulas, R represents hydrogen or an acyl group of a carboxylic acid containing less than 12 carbon atoms such as acetyl, propionyl, butyryl, and cyclopentylpropionyl, preferably acetyl, and $R^1$ represents hydrogen or a lower alkyl radical such as methyl, ethyl or propyl.

Isolated steroidal ketones and isolated steroidal aldehydes utilized as the starting material in the process of the present invention include those of the androstane, pregnane, and cholestane series and the 19-nor derivatives thereof such as, for example, estrone,
18-methylstreone,
3-methoxyestra-1,3,5(10)-trien-17-one,
3-actoxyandrostan-17-one,
androsane-3,17-dione,
androst-2-ene-6,17-dione,
$3\beta$-hydroxypregn-5-en-20-one,
$3\beta,20\beta$-dihydroxy-18-ethylpregn-5-en-18-one,
$3\beta,20\beta$-dihydroxy-18-ethylpregn-5-en-18-one,
cholestan-3-one,
cholest-2-en-6-one,
2,2-dimethyl-17$\alpha$-vinyl-17$\beta$-hydroxyestran-3-one,
17$\beta$-hydroxyestr-4-en-11-one,
3,17$\beta$-dihydroxyestra-1,3,5(10)-trien-15-one-17-acetate,
3-n-butoxyestra-1,3,5(10)-trien-17-one,
1$\alpha$-methyl-17$\beta$-hydroxy-androstan-3-one,
6$\alpha$-fluoro-11$\beta$-hydroxy-5$\alpha$-androstane-3,17-dione,
17$\alpha$,20;20,21-bismethylenedioxy-5$\alpha$-pregn-2-en-11-one,
19-norpregna-3,5-dien-20-one,
3$\beta$-fluoropregn-5-en-20-one,
3$\beta$-acetoxy-androst-5-en-17-one,
17$\beta$-hydroxyandrostan-3-one,
17$\alpha$-methyl-17$\beta$-hydroxyandrostan-3-one,
3$\alpha$-formylandrostan-17$\beta$-ol,
3$\alpha$-formyl-17$\alpha$-methylandrostan-17$\beta$-ol,
3$\beta$-formyl-17$\alpha$-methylandrostan-17$\beta$-ol,
2$\alpha$-formyl-5$\alpha$-pregnan-20-one,
2$\beta$-formyl-5$\alpha$-pregnan-20-one,
3$\beta$-formylandrostan-17$\beta$-ol,
3$\beta$,17$\beta$-diacetoxy-10$\beta$-formylandrost-5-ene,
3$\beta$,17$\beta$-diacetoxy-10$\alpha$-formylandrost-4-ene,
3$\beta$-acetoxy-10$\beta$-formylpregn-5-en-20-one,
10$\beta$-formylandrost-4-ene-3,17$\beta$-diol,
3$\beta$-hydroxy-13$\beta$-formyl-5$\alpha$-pregnan-20-one,
10$\beta$-formylandrost-5-ene-3$\beta$,17$\beta$-diol,
13$\beta$-formylandrost-5-ene-3$\beta$,17$\beta$-diol,
6$\alpha$-formyl-5$\alpha$-pregnane-3$\beta$,20$\beta$-diol,
19-methyl-3$\beta$,17$\beta$-dihydroxyandrost-5-en-19-one,
19-ethyl-3$\beta$,17$\beta$-dihydroxyandrost-5-en-19-one,
19-methyl-3$\beta$,17$\beta$-dihydroxyandrost-5-en-19-one, 3,17-diacetate,
17$\alpha$,19-dimethyl-3$\beta$,17$\beta$-dihydroxyandrost-5-en-19-one,
10$\beta$-formylandrost-5-ene-3$\beta$,17$\beta$-diol,
and the like.

By use of the process of the present invention, the conversion of steroids containing an isolated carbonyl group or an isolated aldehyde group into the corrsponding desoxy derivative is accomplished in one step with relatively high yields. Thus, 10$\beta$-formyl steroids are converted directly into 10$\beta$-methyl steroids to furnish valuable androstane and pregnane compounds. Similarly, 18-keto steroids of the androstane series, pregnane series, and 19-nor derivatives thereof are converted directly into the corresponding 18-desoxy, i.e. 18-alkyl, compounds possessing enhanced hormonal activity.

In practicing the process of the present invention, the steroid starting material is introduced into the cathode compartment of a divided electrolysis cell. This is best accomplished by the use of an organic solvent carrier which is water-miscible and inert to the electrolytic action of the process. Thus, suitable organic solvents for the present invention include ethers such as dioxane, tetrahydrofuran, lower monohydric alcohols such as methanol, isopropanol, and ethanol, lower alkylene glycols such as ethyleneglycol, propylene glycol, mixtures of the foregoing solvents, and the like. The amount of organic solvent present in the system can range from that amount which is sufficient to dissolve or substantially dissolve the steroidal ketone or aldehyde up to about 94%, preferably from about 20% to about 85% by weight of the total electrolytic medium. The expression electrolytic medium as used herein includes the organic solvent, water and electrolyte.

The preferred electrolyte materials are sulfuric acid, hydrochloric acid, and perchloric acid; however, other mineral acids can also be employed such as hydrobromic acid, phosphoric acid, and the like. The amount of acid present in the system should be within the range of about 1.0% to about 20% by weight of the total electrolytic medium, preferably from about 2.0% to about 15%. Due to the instability of steroidal ketones and aldehydes in the presence of a high concentration of acid, there is generally no advantage in using a concentration higher than 20%. The balance of the electrolytic medium consists essentially of water which is present in an amount at least sufficient to dissolve or provide good dispersion of the electrolyte and thereby render the electrolytic medium conductive to an electric current. The amount of water present should be at least 5% by weight of the electrolytic medium, preferably from about 10% to about 75%. A greater quantity of water may be employed depending upon such factors as the amount of organic solvent used, the solubility of the steroid employed and the amount of electrolyte present.

The electrochemical reduction process of the present invention is conducted in an electrolytic cell having two compartments, an anode compartment and a cathode compartment, which are separated by a semi-permeable membrane. The semi-permeable membrane employed may be formed of any material which is inert to the electrolytic action and which permits passage of the ionic phase from one compartment to the other without permitting passage of the steroid material from the cathode compartment. Suitable membrane materials include clay, porous alumina, inert polymeric membranes such as polytetrafluoroethylene, cellulose acetate, and the like.

Cathode materials which are used in the process of the present invention include the high hydrogen over-voltage materials such as lead, mercury, cadmium, zinc and the like. The cathode may be in any number of physical forms but preferably in a form having a high surface area such as a sheet or a wire mesh. Advantageously, the cathode is sufficiently rigid to be utilized as a means for stirring or agitating the steroidal solution in the cathode compartment.

Anode materials which may be used in the process of the present invention include any difficultly oxidizable conductor such as carbon, platinum, iron, lead, and the like. In general, the anode material may be any conductor which is not attacked by the electrolytic medium in a manner which would transform the anode material into a soluble state.

In electrochemically reducing an isolated carbonyl group or an isolated aldehyde group of a steroid into the corresponding desoxy group by the process of the present invention, a current density within the range of about 0.005 to about 0.2 ampere per square centimeter is used, preferably from about 0.02 to about 0.1 ampere/cm.$^2$. Depending primarily upon the current efficiency of the system, a reaction time of the order of about 1 to about 16 hours is employed. The most beneficial reaction time for a particular steroid is readily determinable by one of ordinary skill in the art, giving due consideration to such factors as the current density, the current efficiency, the temperature, the concentration of steroid, and the like. As a rule, a current density within the above limits applied for a period of time sufficient to pass the equivalent of a least four Faradays per mole of steroid of electric current at the current employed is sufficient. However, because an electrolysis system normally does not have a current efficiency of 100% but rather in an area of about 40% to about 80% current efficiency, a greater amount of electricity is required. Thus, for example, in the case of a system which has a current efficiency of about 50%, an amount of electricity equivalent to eight Faradays, preferably a slight excess, is employed. In the case of steroids containing more than one isolated carbonyl group or isolated aldehyde group, an additional four Faradays is required for each group in excess of one.

The process of the present invention can be conducted at a temperature within the range of about 0° C. to about 70° C., preferably from about 10° C. to about 40° C. Higher temperatures may be used, but in general, there is no advantage in doing so in that an increase in temperature generally causes a decrease in the yield of the final product. The most beneficial temperature for the reduction of a particular steroid is readily determinable by one of ordinary skill giving due consideration to such factors as the amount of electrolyte, the current, the concentration of steroid, the cathode material, and the like.

In practicing the process of the present invention, the concentration of steroidal ketone or aldehyde in the cathode compartment may vary considerably. Desirably, the concentration of steroid is maintained at a maximum to achieve the greatest efficiency for transformation of the isolated keto or isolated aldehyde group into the corresponding desoxy group. In general, a concentration of steroid within the range of about 0.1 to about 20% by weight of the total reaction mixture is employed, preferably about 1% to 15%. Higher concentrations can be used such as a suspension of steroid in which case the reduction product should be soluble in the organic phase of the reaction mixture.

An electrolysis cell suitable for practicing the process of the present invention, consists of a rectangular block of Plexiglas having an anode compartment in communication with a cathode compartment of equal volume. The passage between the two compartments is provided with a semi-permeable membrane, e.g. a cellulose dialysis membrane, which permits free passage of the ionic phase but yet restricts movement of the steroidal material to the cathode compartment. A suitable cellulose dialysis membrane is regenerated cellulose prepared by the viscose process having a pore radius of 24 angstroms as determined by the average rate of water flow through a film of the material. Other two compartment electrolysis cells can be used to practice the process of the present invention, the foregoing only being illustrative.

The folowing examples are provided to illustrate but are not intended to limit the scope of the present invention.

EXAMPLE 1

A mixture of 25 ml. of dioxane and 0.2 gram of 17β-hydroxyandrost-3-one is introduced into the cathode compartment of an electrolysis cell provided with a lead cathode and a lead anode, each electrode measuring 1 cm. by 3 cm. by 1.6 mm. The cathode and anode compartments are separated by a cellulose dialysis membrane as described hereinabove. Ten ml. of 10% sulfuric acid is then poured into the cell. Then a current of 0.2 ampere is applied for about 3.5 hours while stirring the reaction mixture. Thereafter, the current is shut-off and the mixture is withdrawn from the cell and concentrated under vacuum. The residue is taken up in water, filtered, and the solid product is washed several times with water and dried under vacuum to yield 3-desoxyandrostan-17β-ol which can be further purified by recrystallization.

EXAMPLE 2

By repeating the process of Example 1 using as the starting material, the steroids appearing under Column I, the corresponding compound appearing under Column II, is obtained.

| I | II |
|---|---|
| 3β-hydroxypregn-5-en-20-one | Pregn-5-en-3β-ol. |
| 3-methoxyestra-1,3,5(10-trien-17-one. | 3-methoxyestra-1,3,5(10)-triene. |
| 10β-formylandrost-5-ene-3β,17β-diol. | Androst-5-ene-3β,17β-diol. |
| 3β-acetoxyandrost-5-en-17-one | 3β-acetoxyandrost-5-ene. |
| 3β-formyl-17α-methylandrostan-17β-ol. | 3β,17α-dimethylandrostan-17β-ol. |
| 3β,17β-diacetoxy-10β-formyl-androst-4-ene. | 3β,17β-diacetoxyandrost-4-ene. |
| 17β-hydroxyestr-4-en-11-one | Estr-4-en-17β-ol. |
| 6α-fluoro-3β,11β-dihydroxy-androstan-17-one. | 6α-fluoroandrostane-3β,11β-diol. |
| 19-norpregna-3,5-dien-20-one | 19-norpregna-3,5-diene. |
| 19-methyl-3β,17β-dihydroxy-androst-5-en-19-one. | 19-methylandrost-5-ene-3β,17β-diol. |
| 3β,20β-dihydroxy-18-methylpregn-5-en-18-one. | 18-methylpregn-5-ene-3β,20β-diol. |

EXAMPLE 3

A mixture of 50 ml. of dioxane and 1 g. of 2β-formyl-5α-pregnan-20-one is introduced into the cathode compartment of an electrolysis cell provided with a lead cathode and a lead anode, each having an area of 3 square cm. Thereafter, 50 ml. of water and 6 ml. of concentrated sulfuric acid are introduced and a current of 0.3 ampere applied for about 8 hours while slowly stirring the reaction mixture. Thereafter, the mixture is removed from the cell and concentrated under vacuum. The residue is taken up in water and the thus-obtained mixture extracted with chloroform. The chloroform extracts are combined, washed, dried and evaporated under vacuum to yield 2β-methyl-5α-pregnane.

By repeating the process of Example 3, using the starting material appearing under Column I, the corresponding desoxy derivatives under Column II are obtained.

| I | II |
|---|---|
| Androst-2-ene-6,17-dione | Androst-2-ene. |
| 6α-fluoro-3β-hydroxyandrostane-11,17-dione. | 6α-fluoroandrostan-3β-ol. |
| 17α,20;20,21-bismethylenedioxy-5α-pregn-2-en-11-one. | 17α,20;20,21-bismethylenedioxy-5α-pregn-2-ene. |
| 2β-formyl-5α-pregnan-20-one | 2β-methyl-5α-pregnane. |
| 10β-formylandrost-5-ene-3β,17β-diol. | Androst-5-ene-3β,17β-diol. |
| 6α-fluoro-11β-hydroxy-5α-androstane-3,17-dione. | 6α-fluoro-5α-androstan-11β-ol. |

EXAMPLE 4

A mixture of 25 ml. of dioxane and 0.2 g. of 10β-formylandrost-4-ene-3β,17β-diol is added to the cathode compartment of a divided electrolysis cell provided with a lead cathode and a lead anode, each measuring about 1 cm. by 3 cm. by 1.6 mm., and a cellulose dialysis membrane separating the anode and cathode compartments. Ten milliliters of 10% sulfuric acid is then added to the cell. A current of 0.2 ampere is then applied for about 3.5 hours while slowly stirring the reaction mixture in the cathode compartment. Thereafter, the current is shut-off and the resulting mixture is withdrawn from the cell and concentrated under vacuum. The residue is taken up in water, filtered, and the solid product is washed several times with water and dried under vacuum to furnish androst-4-ene-3β,17β-diol.

A mixture of 1 gram of androst-4-ene-3β,17β-diol in 20 ml. of dioxane, and 1.1 molar equivalents of 2,3-dichloro-5,6-dicyano-1,4-benzoquinone is allowed to stand at room temperature for 3 hours. The solid formed during the reaction is removed by filtration and the filtrate evaporated to dryness. The residue is dissolved in acetone and filtered through 20 g. of alumina to yield 17β-hydroxyandrost-4-en-3-one which can be further purified by recrystallization from acetone:hexane.

EXAMPLE 5

A mixture of 100 mg. of 3β,17α-dihydroxypregn-5-en-20-one and 20 ml. of dioxane followed by 10 ml. of 10% sulfuric acid is added to the cathode compartment of a divided electrolysis cell provided with a lead cathode and a lead anode (each measuring about 2 cm. by 4 cm. by 1.6 mm.) and a cellulose dialysis membrane separating the anode and cathode compartments. A current of 0.2 ampere is then applied for 5.5 hours while slowly stirring the reaction mixture in the cathode compartment. Thereafter, the current is shut-off and the reaction mixture withdrawn from the cell rinsing with methanol. These are combined, concentrated to about 15 ml. and the thus-formed precipitate filtered to give pregn-5-en-3β-ol which can be purified by recrystallization from methanol:water.

EXAMPLE 6

The procedure of Example 5 is repeated using 200 mg. of 3β,17α-dihydroxypregn-5-en-20-one in an electrolytic medium of 45 ml. of dioxane and 30 ml. of 10% sulfuric acid and applying the current for 4 hours. Thereafter, the reaction mixture is withdrawn and evaporated to a residue which is chromatographed on a silica gel plate eluting with ethyl acetate:hexane (1:1). The less polar material is removed to furnish pregn-5-en-3β-ol which can be further purified, if desired, by recrystallization.

EXAMPLE 7

A mixture of 200 mg. of 17β-hydroxy-5α-androstan-3-one and 40 ml. of dioxane followed by 25 ml. of 10% sulfuric acid is added to the cathode compartment of a divided electrolysis cell provided with a lead cathode and lead anode (each measuring 1 cm. by 3 cm. by 1.6 mm.) and a cellulose dialysis membrane. A current of 0.2 ampere is then applied for 4 hours. Thereafter, the reaction mixture is withdrawn and concentrated. The residue is then chromatographed on silica gel eluting with ethyl actate:hexane to furnish as the less polar product 5α-androstan-17β-ol and as the more polar product 5α-androstane-3β,17β-diol.

The above procedure is repeated with the exception of using an equivalent amount of 17β-hydroxyestr-4-en-11-one in place of 17β-hydroxy-5α-androstan-3-one and there is obtained estr-4-en-17β-ol and estr-4-ene-11α,17β-diol which can be separated by chromatography on silica gel.

What is claimed is:

1. A process for the reduction of an isolated carbonyl group or an isolated aldehyde group of a steroid selected from the group consisting of an isolated steroidal ketone and an isolated steroidal aldehyde, respectively, into the corresponding methylene group or methyl group, respectively, which comprises subjecting said steroid to electrochemical reduction at a cathode of high over-voltage in an electrolytic medium comprising mineral acid electrolyte, water and water-miscible, inert organic solvent.

2. The process according to claim 1 wherein said cathode is selected from the group consisting of lead, zinc, mercury, and cadmium, and the mineral acid electrolyte is selected from the group consisting of sulfuric acid, hydrochloric acid and perchloric acid.

3. The process according to claim 1 wherein said cathode is selected from the group consisting of lead, zinc, mercury, and cadmium, said mineral acid electrolyte is selected from the group consisting of sulfuric acid, hydrochloric acid and perchloric acid and said reduction is conducted at a current density within the range of about 0.01 to about 0.2 ampere per square centimeter.

4. The process according to claim 3 wherein said current density is within the range of 0.02 to about 0.1 ampere per square centimeter.

5. The process according to claim 4 wherein said steroid is an isolated steroidal aldehyde.

6. The process according to claim 5 wherein said isolated steroidal aldehyde is a 10-formyl steroid.

7. The process according to claim 5 wherein said isolated steroidal aldehyde is 3β,17β-diacetoxy-10β-formyl-androst-5-ene.

8. The process according to claim 5 wherein said isolated steroidal aldehyde is 10β - formylandrost - 4 - ene-3β,17β-diol.

9. The process according to claim 4 wherein said steroid is an isolated steroidal ketone.

10. The process according to claim 9 wherein said isolated steroidal ketone is a 17-oxo steroid.

11. The process according to claim 9 wherein said isolated steroidal ketone is a 3-oxo steroid.

References Cited

UNITED STATES PATENTS

| | | | |
|---|---|---|---|
| 2,356,596 | 8/1944 | Kramli et al. | 204—75 |
| 3,140,989 | 7/1964 | Kabasakalian et al. | 204—75 |

JOHN H. MACK, Primary Examiner

H. M. FLOURNOY, Assistant Examiner